No. 734,584. PATENTED JULY 28, 1903.
T. H. MAYO.
MACHINE FOR MAKING HEELS.
APPLICATION FILED JAN. 10, 1902.
NO MODEL. 7 SHEETS—SHEET 1.

Fig. 1.

Witnesses.
Inventor.
Thomas H. Mayo.

No. 734,584. PATENTED JULY 28, 1903.
T. H. MAYO.
MACHINE FOR MAKING HEELS.
APPLICATION FILED JAN. 10, 1902.
NO MODEL. 7 SHEETS—SHEET 5.

Witnesses.
Inventor.
Thomas H. Mayo.

No. 734,584. PATENTED JULY 28, 1903.
T. H. MAYO.
MACHINE FOR MAKING HEELS.
APPLICATION FILED JAN. 10, 1902.
NO MODEL. 7 SHEETS—SHEET 7.

Witnesses.
W. C. Lunsford.
Q. C. Kaiser.

Inventor.
Thomas H. Mayo.
By Bradley Gregory,
attys.

No. 734,584. Patented July 28, 1903.

UNITED STATES PATENT OFFICE.

THOMAS H. MAYO, OF MELROSE HIGHLANDS, MASSACHUSETTS.

MACHINE FOR MAKING HEELS.

SPECIFICATION forming part of Letters Patent No. 734,584, dated July 28, 1903.

Application filed January 10, 1902. Serial No. 89,160. (No model.)

*To all whom it may concern:*

Be it known that I, THOMAS HENRY MAYO, a citizen of the United States, and a resident of Melrose Highlands, county of Middlesex, State of Massachusetts, have invented an Improvement in Machines for Making Heels, of which the following description, in connection with the accompanying drawings, is a specification, like characters on the drawings representing like parts.

In the manufacture of boots and shoes it is customary, especially in the cheaper grade of shoes, to employ what are commonly termed "pieced" heels—that is, heels in which a part or all of the individual lifts of the heel are made of one or more pieces of leather. Heretofore, so far as I am aware, it has been the universal practice to make these pieced heels by hand, this operation being performed by cutting from scraps of leather differently-shaped pieces which when put together form a lift of the heel and then assembling these lifts and securing them together in some suitable way.

It is the object of my present invention to provide a machine for making pieced heels, which machine preferably is entirely automatic in its action, so that it is simply necessary to feed into suitable hoppers the properly-shaped pieces from which the heel is to be made, and the selecting of the appropriately-shaped pieces and the assembling of them together are performed entirely by the machine without the necessity of any hand manipulation.

The invention comprises a suitable matrix in which the heel is formed and assembling devices operating to select the appropriately-shaped pieces for each lift of the heel and assemble them in the matrix. The matrix is preferably made expansible, and means are provided whereby after the pieces are assembled in the expanded matrix the latter is contracted or collapsed to force the pieces solidly into their position. Suitable pasting mechanism is also employed, which operates to apply paste or other adhesive to the individual pieces as they are being assembled, whereby after they are assembled they adhere together to form the completed heel.

In the preferred embodiment of my invention I employ a suitable sliding frame or matrix-supporting member, which is supported beneath the assembling devices and which carries two matrices. The bottom or bed of each matrix is movable to vary the depth of the matrix, and in normal position the said bottom or bed will be in its elevated position, this being the position when the matrix is first passed beneath the assembling devices. The assembling devices are operated by suitable mechanism, and they feed or deliver to the matrix in the proper order the various pieces going to make up each lift of the heel, the pieces of each lift preferably being delivered substantially simultaneously to the matrix and the lifts being assembled successively. Automatic mechanism operates to lower the bed of the matrix as the pieces composing each lift are assembled and delivered to the matrix. When the required number of lifts have been assembled, the assembling mechanism automatically ceases its operation and the sliding frame, supporting the matrix, is moved so as to withdraw or remove the filled matrix from beneath the assembling devices and bring the other or empty matrix into position to receive the pieces forming a second heel. When the position of the frame or matrix-supporting member has thus been shifted, the formed heel is automatically discharged from the matrix in which it was formed, and at the same time the assembling devices are set in operation, whereby a second heel is formed in the second matrix in the manner above described. When such second heel has been formed, the slide supporting the matrix is moved to its initial position, thus bringing the first matrix in operative relation to the assembling devices and discharging the second heel from its matrix. The assembling devices or selectors take the pieces for forming the heels from hoppers into which the differently-shaped pieces are placed, and it is simply necessary, therefore, to keep the hoppers supplied with the appropriately-shaped piece, as the mechanism performs all the other steps incident to the completion of the heel.

In the drawings, Fig. 6 is a perspective showing one form of mechanism for automatically performing the various steps above described, the main frame of the machine being shown in dotted lines. Figs. 7 and 8 are details of construction hereinafter referred to. Fig. 15 is a section on line x x, Fig 13. Fig. 16 is a section on line x x, Fig. 14. Fig. 17 is a diagrammatic view showing the way in which the selectors operate to assemble the pieces of the heel. Fig. 18 shows one lift of one form of pieced heel. Fig. 19 shows the pieces forming another lift of the heel. Fig. 21 is a detail hereinafter referred to. Fig. 22 is a detail of the means for holding the cam for raising and lowering the matrix-bed in any adjusted position.

While my machine is capable of making any pieced heel in which the pieces are assembled in some regular order—that is, a heel in which certain lifts are composed of a certain number of pieces having a definite shape—yet for convenience I have illustrated the machine as adapted to construct a heel such as is illustrated in my copending application, Serial No. 15,488, filed May 4, 1900. I desire to state, however, that the invention is not limited to the construction of this particular type of heel, as by merely varying the shape of some of the parts to be hereinafter described other forms of pieced heels may be constructed.

Figures 15, 16, 17, 18, 21, 22:
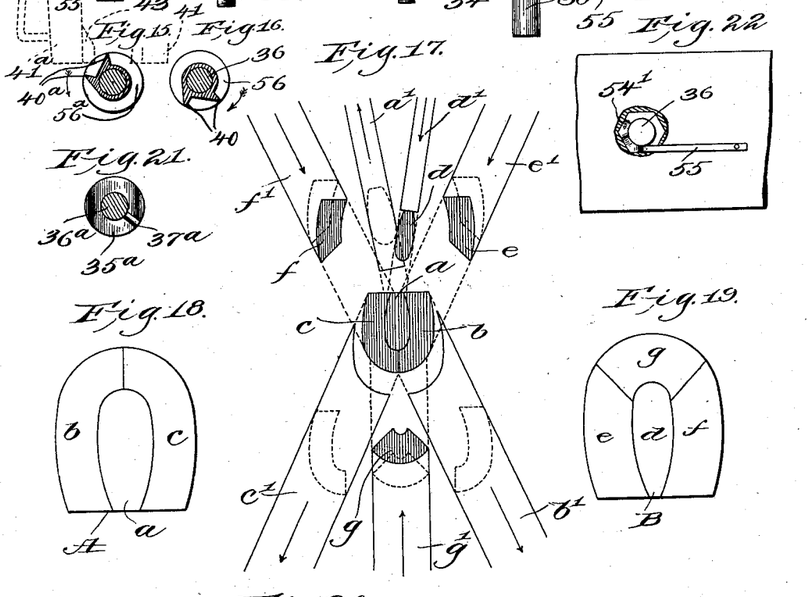

In the heel above referred to each lift comprises a rim-section and a center section, the center sections of adjacent lifts being of different widths, whereby the outer edge of the center section of one lift overlaps the rim-section of the adjacent lift. For convenience the rim-sections are made in two or more parts, as illustrated in Figs. 18 and 19, respectively, which show two lifts of the heel. In the lift shown in Fig. 18 the center section is designated by $a$ and the rim-section is composed of the two pieces $b$ and $c$, these three pieces forming together one lift A of the heel. The next lift, which I have designated as B, Fig. 19, has the center section $d$ and the rim-section, composed of three pieces $e f g$. The center section $d$ of the lift B, it will be noted, is smaller than the center section $a$ of the lift A, so that when the lifts are superposed one on top of the other the outer edge of the center section of one lift overlaps and interlocks with the rim portion of the next adjacent lift.

In assembling the heel a suitable matrix is employed of a shape to receive the pieces forming the heel, and an assembling device in the nature of a plurality of selectors is employed to select and assemble the various pieces in the appropriate order, the selectors taking the pieces from suitable hoppers. I preferably employ as many hoppers as there are different-shaped pieces, there being one hopper suitably shaped to contain a plurality of pieces having the shape of the piece $a$, another hopper containing a plurality of pieces having the shape of the piece $b$, another hopper containing a plurality of pieces of the shape $c$, another hopper containing a plurality of pieces of the shape of piece $d$, and so on.

Figure 20:
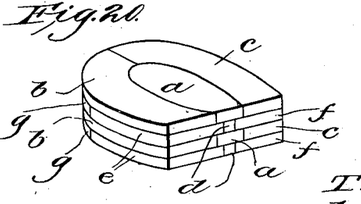
Fig. 20 illustrates one form of pieced heel which my machine is capable of constructing.

The selectors, which go to make up the assembling device and which select the appropriate pieces for each lift of the heel, are shown in the form of slides moving in runways, and in Fig. 17 I have illustrated diagrammatically the manner in which the heel is assembled, and in said figure I have designated that selector which selects a certain-shaped piece with the same reference-letter primed as that which designates the piece. The selectors preferably have a diverging or radial arrangement, and in said Fig. 17 the selectors $e'$, $f'$, $d'$, and $g'$, which constitute one group, are moving toward the center, as indicated by the arrows, and are carrying with them the parts $e f g d$, which constitute the lift shown in Fig. 19, while the selectors $a'$, $b'$, and $c'$, which constitute another group, are illustrated as just being withdrawn from the matrix into which they have just deposited the parts $a$, $b$, and $c$, as shown. The selectors of each group will preferably be simultaneously moved forward and backward, and the two groups of selectors will move in alternation, so that the pieces of any one lift are simultaneously assembled and the different lifts are successively formed. The heel illustrated in Fig. 20 has four lifts. Consequently each set of selectors will make two forward movements to construct the heel shown. I would say, however, that if the heel contained a greater or less number of lifts than four the number of forward movements of each set of selectors would be correspondingly varied.

Having briefly described one form of heel which can be made by means of my invention and illustrated diagrammatically the steps performed in making the heel, I will now proceed to describe more in detail the specific mechanism illustrated and in which I have herein chosen to embody my invention.

Figure 1:
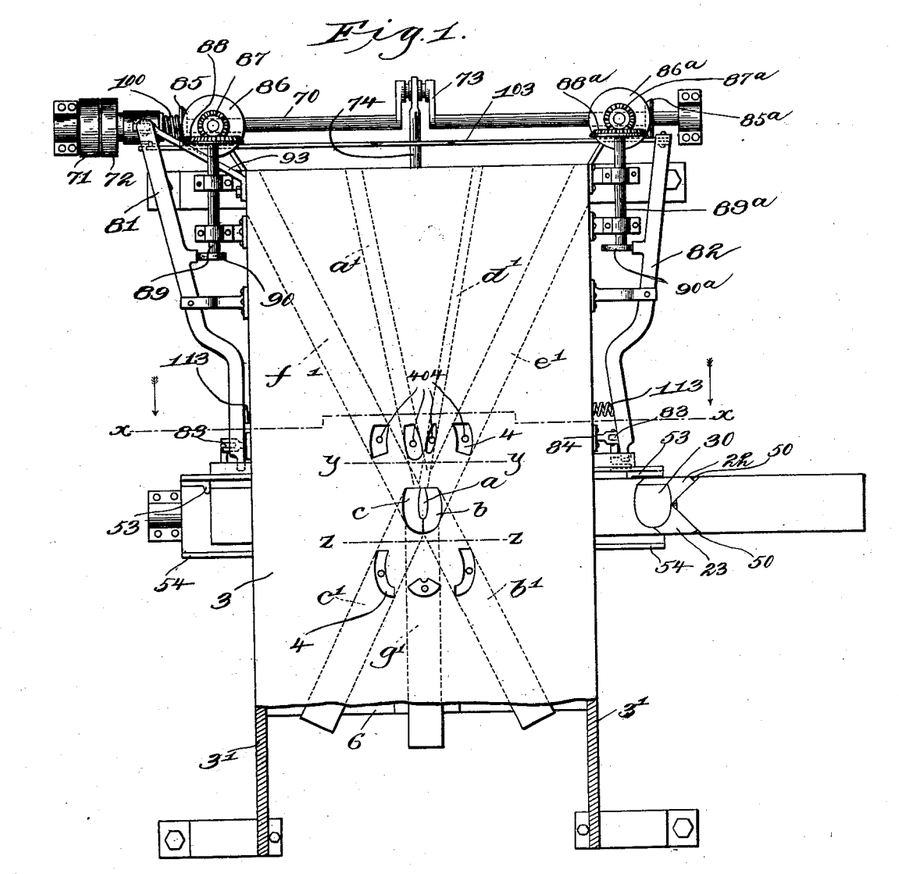
Figure 1 is a top plan view of my improved machine with a portion of one end thereof broken out to better show the construction.
Figure 2:
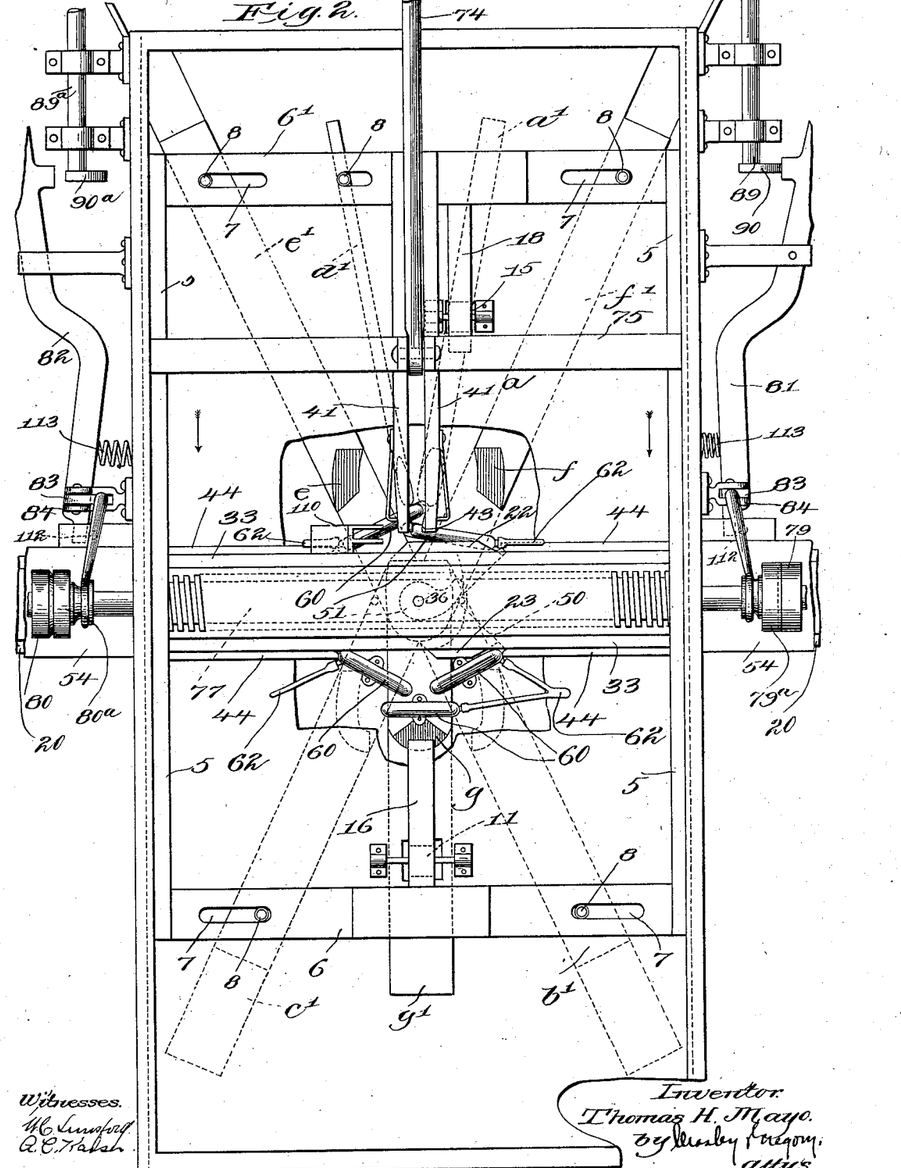
Fig. 2 is a bottom plan view.
Figure 9:
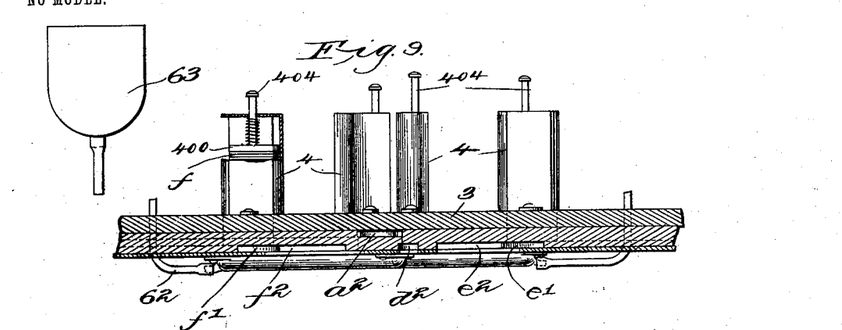
Fig. 9 is a section of the bed of the machine on the line y y, Fig. 1, looking toward the top of the sheet.
Figure 10:
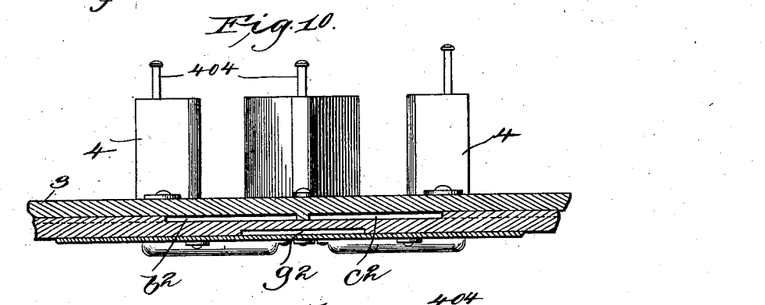
Fig. 10 is a partial section on the line z z looking toward the bottom of the sheet.

The machine comprises a suitable bed 3, which supports the hoppers containing the various pieces, as will be presently described, and in which bed are formed a plurality of runways corresponding in number to the number of selectors, each runway being appropriately shaped to receive its selector and the said runways being preferably diverging from a central point at which the pieces are assembled. Figs. 1 and 2 show in dotted lines the position of the various runways. I will preferably make the two series of runways in different horizontal planes, as illustrated in Figs. 9 and 10, the runways $a^2$, $b^2$, and $c^2$, in which reciprocate the selectors $a'$, $b'$, and $c'$, respectively, being in a horizontal plane above the runways $d^2$, $e^2$, $f^2$, and $g^2$, in which reciprocate the selectors $d'$, $e'$, $f'$, and $g'$, respectively.

Figure 11:
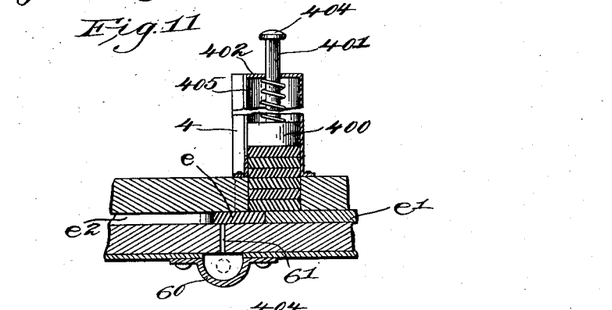
Figs. 11 and 12 are details of the hopper employed.

Mounted in the bed-plate 3, above each runway, is a suitable hopper 4 of a shape to receive the particular piece with which the selector running in said runway coöperates, and the bed-plate is cut away, as shown in Fig. 11, to provide a passage-way by means of which the pieces pass from the hopper into the runway. The hoppers are placed, with relation to the runways, in such a position that when the selectors are retracted to the full limit of their stroke they pass from beneath the hopper, and when this occurs suitable feeding mechanism is provided to force the pieces in the hopper down so that the bottom piece comes into the runway directly in front of the selector. The forward movement of the selector will then carry the bottom piece before it through the runway, as shown in Fig. 11, and deliver the same to the matrix, to be presently described.

One convenient form of feeding mechanism is illustrated in Fig. 11, wherein 400 is a spring-pressed plunger bearing on the superposed pieces in the hopper, the stem 401 of the plunger passing through the bridge-piece 402 across the top of the hopper and having a knob or handle 404 at its upper end. The front of the hopper is cut away, as at 405, to provide an opening through which the pieces may be fed into the hopper, the plunger during such operation being manually raised.

I would here remark that, as shown in Fig. 17, the end of each selector is properly shaped to fit the particular piece which it delivers to the matrix, so that the various selectors operate not only to deliver the pieces to the matrix, but also operate to deliver them in the proper position, the special shape of the end of each selector preventing the pieces being delivered from turning or twisting in the runway. In Fig. 17 the shape and position of the various hoppers are shown by dotted lines, and it will be seen, therefore, that each piece is delivered to the raceway in a position substantially parallel to the position it will occupy in the assembled heel, and since the end of each selector is shaped to fit the outside contour of the pieces it coöperates with it will be obvious that there will be no twisting of any piece in traversing the raceway.

It is desirable that the various pieces comprising any individual lift should be simultaneously deposited in the matrix, and therefore mechanism is provided for simultaneously giving to all of the selectors of any one series a forward movement. One convenient way of accomplishing this is illustrated in the drawings, wherein the frame 3', supporting the bed-plate 3, is provided with suitable guideways in which play slides 5, the said slides being connected at their ends with suitable bridge-pieces 6 and 6', which are slotted, as at 7, said slots receiving pins 8, secured to certain of the selectors. As illustrated in Fig. 2, the selectors $b'$ and $c'$ have a pin-and-slot connection with bridge-piece 6, while the selectors $e'$, $f'$, and $d'$ have a similar connection with the bridge-piece 6'. From this description it will be seen that when the slides 5 are moved in one direction the selectors $b'$ and $c'$ will be carried toward the center and will deliver to the matrix-pieces $b$ and $c$, (the pins 8, secured to said selectors, playing in the slots 7,) while when the slides are moved in the opposite direction the selectors $e'$, $f'$, and $d'$ will be carried inward to deliver the pieces $e$, $f$, and $d$ to the matrix, and at the same time the selectors $b'$ and $c'$ will be withdrawn.

Figure 26:
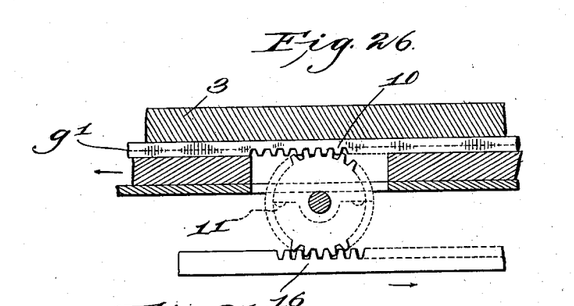
Figs. 26 and 27 are details of the means for giving certain selectors their reciprocating movement.
Figure 27:
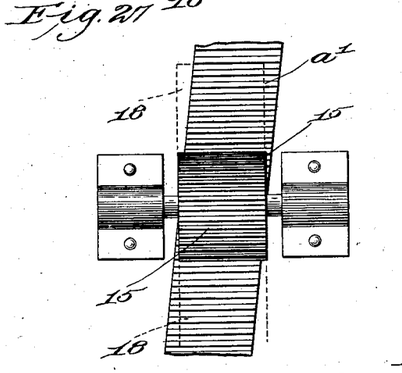

It will be observed that the selector $g'$ is in the same series or group as the selectors $e'$ $f'$ $d'$, and consequently must be moved forward or toward the center simultaneously with said selectors. To accomplish this, I provide the said selector $g'$ on its under side with teeth constituting a rack 10, with which meshes a pinion 11, mounted in fixed bearings in the frame. A coöperating rack 16 is carried by one of the bridge-pieces 6, the said bridge-piece having a dropped portion 14, to which one end of the said rack 12 is secured. With this construction it will be observed that when the slides 5 are moved in a direction to give a forward movement to the selectors $e'$ $f'$ $d'$ the rack-and-pinion construction above described will operate to give the same movement simultaneously to the selector $g'$. (See Fig. 26.) The selector $a'$ is given its forward movement in a similar way, and for this purpose it is provided on its under face with gear-teeth which mesh with a pinion 15, mounted in suitable bearings on the under side of the bed, and the bridge 6' has rigid therewith a rack 18, which meshes with and operates the pinion 15. By means of this construction the selector $a'$ is given a movement in an opposite direction from that of the slides, and consequently moves forward and backward simultaneously with the selectors $b'$ and $c'$. Since the selector $a'$ has a slightly-diverging position, I construct the teeth on the said selector at an angle, as shown in Fig. 27, said teeth being parallel to the axis of the pinion.

Figure 3:
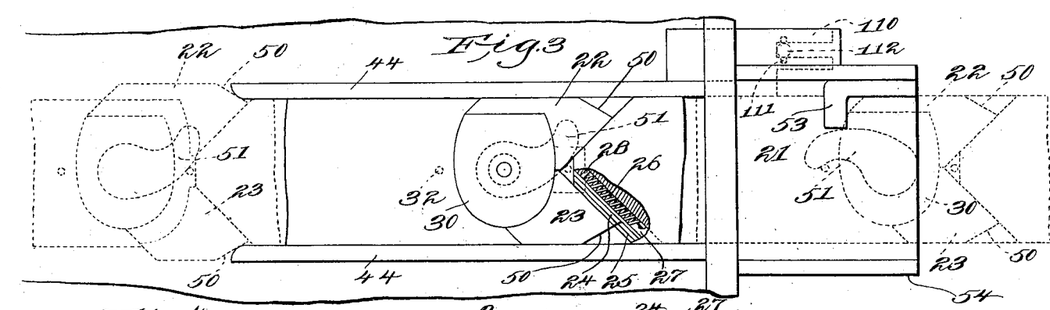
Fig. 3 is a detail of a matrix.
Figures 13, 14:
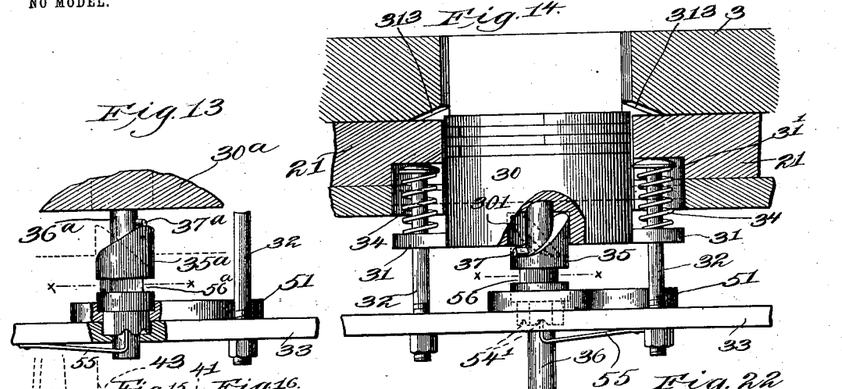
Figs. 13 and 14 are details of the mechanism for raising and lowering the bed of the matrix.

From the above construction it will apparent that the movement of the slides in one direction will cause the selectors of one group or series to move forward to assemble the pieces of one lift, while the reversed movement of the slide retracts the selectors previously operated and moves forward the selectors of the other group or series to assemble the pieces of the next succeeding lift of the heel. As the pieces are thus assembled they are delivered into a matrix which has a shape of the heel to be made, the said matrix serving to form the various pieces into a heel. I will preferably employ a matrix in which a portion of the side walls thereof are movable outward or inward, to thereby expand or contract the matrix, and in which the bottom or bed of the matrix is vertically movable to vary the depth thereof. The matrix is illustrated as being supported in a matrix-supporting member or slide 20, which is mounted in the frame to move transversely thereof, the said slide 20 being shown as comprising a bed-piece 21, in which is formed a pocket of the shape of the heel, as illustrated in Fig. 3. The matrix, as above stated, is expansible, and it is preferably made so by providing the sliding blocks 22 and 23, which are shaped at their inner edges to form part of the side walls of the matrix and which slide radially outward, as shown in Fig. 3, each of said slides being shown as having a web 24, which plays in a suitable guiding-groove 25 in the bed-piece 21. Preferably the blocks have mechanism connected therewith tending normally to expand the same, and as one convenient means for accomplishing this I have illustrated a spring 26, which is received in a suitable groove or recess 27 in the bed-plate and which is connected at one end to the bed-plate and at the other end to a pin 28 upon the slide 23, the spring being so constructed as to normally tend to contract. The bottom or bed of the matrix, which is designated by 30, is vertically movable, it being guided in its movement by a depending stem 36, which passes through the lower rail 33, and means are provided so that as the different lifts of the heel are assembled by the selectors the said bed is lowered. The means for controlling the movement of the matrix-bottom 30 in a vertical direction is illustrated in Figs. 13 and 14, from which it will be observed that the said matrix bed or bottom has ears 31 projecting therefrom, through which pass suitable guiding-bolts 32, made fast in the lower rail 33 of the matrix-supporting member 20, the upper ends of said bolts being received in recesses 31' in the bed-piece 21. Suitable springs 34, surrounding the said bolts, tend normally to depress the bed 30, while its adjusted position in a vertical direction is determined by a cam 35, shown as a sleeve through which a projects a stem 36, depending from the matrix-bed 30, the said sleeve being mounted for rotation in a socket in the lower rail 33 of the slide and having its upper surface shaped, as illustrated in Fig. 14, to form a cam-surface, with which coöperates a pin 37, projecting from the stem 36. With this construction it will be observed that when the cam is in the dotted-line position in Fig. 14 the bed of the matrix will be in its elevated position; but when the cam is turned to the full-line position in Fig. 14 the springs will serve to force the bed into its lowered position, the upper part of the cam 35 being received in a suitable recess 301 in the bottom of the matrix-bed when said bed is lowered.

Figure 4:
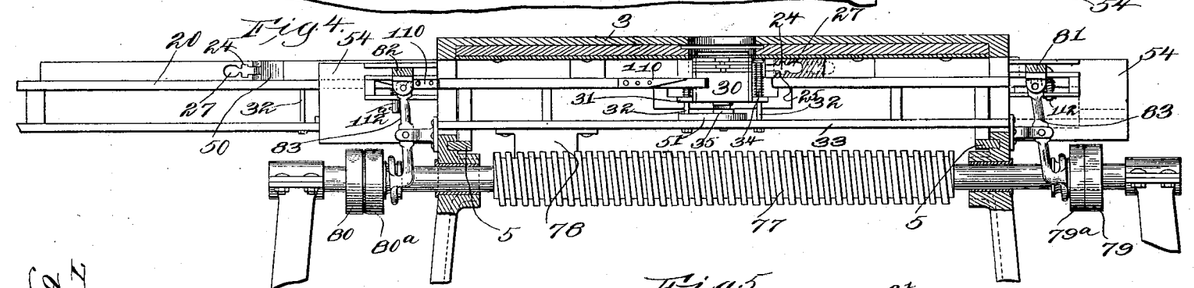
Fig. 4 is a section on the line x x, Fig. 1, looking in the direction of the arrow or toward the bottom of the sheet.
Figure 5:
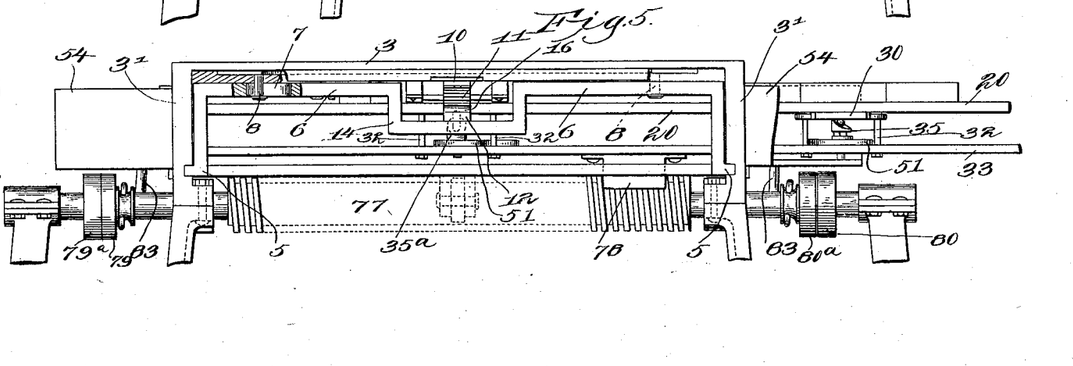
Fig. 5 is an end view of the machine looking from the bottom of Fig. 1.

The matrix-supporting member 20 is considerably longer than the width of the machine, as illustrated, and in this embodiment of my invention it carries two matrices such as I have described above. The position of the two matrices on the slide is such that when one matrix is directly beneath the assembling device the other matrix is outside of the frame of the machine, as best seen in Figs. 4 and 5.

Suitable mechanism, to be presently described, is employed to move the matrix-supporting slide 20 back and forth across the frame of the machine, the construction being such that after a heel has been formed in one matrix the slide is moved transversely of the frame to bring the other matrix beneath the assembling device and to carry the matrix having the completed heel therein outside of the frame, whereby the heel may be removed, and after a second heel has been formed in the second matrix the slide is moved in the opposite direction to bring the first-named matrix back again underneath the assembling device and to carry the second matrix beyond the frame on the opposite side. Since the direction of movement of one matrix in traveling from its position under the assembling device to the outside of the frame where the heel is discharged therefrom is just the opposite from the direction of movement of the other matrix, I will preferably make the position of the cam mechanism for one matrix-bed just the reverse from that for the other matrix-bed, as I will presently describe.

For convenience I have designated the parts comprising the left-hand matrix, Fig. 1, with the same reference-letters as applied to the corresponding part of the right-hand matrix, except that the letters applied to the left-hand matrix have the exponent $a$. Fig. 13 shows a portion of the matrix-bed $30^a$ of the left-hand matrix, Fig. 1, and also the cam $35^a$ and coöperating pin $37^a$, projecting from the stem $36^a$, depending from the matrix, as described with reference to Fig. 14.

As stated previously, the bed of each matrix is in its elevated position when the matrix is first brought under the assembling device and before any pieces are deposited thereon, and suitable mechanism operated from the slides 5 serves to gradually lower the bed as the heel is assembled, so as to carry that part of the heel which has already been built up out of the way of the incoming pieces forming the next lift. For this purpose I have illustrated the cams 35 and $35^a$ as provided with ratchet portions 40 and $40^a$, respectively, with which coöperate one of the fingers 41 and 41ᵃ, carried by one of the bridge-pieces connecting the slides 5, the finger 41 coöperating with the ratchet-teeth on cam 35 and the finger 41ᵃ coöperating with the teeth on the cam 35ᵃ, the said fingers each being shown as having a spring-pawl 43 in its end which engages the ratchet-teeth. The ratchet-teeth 40 on cam 35 are shown as on the right-hand side of the cam, while the teeth 40ᵃ on cam 35ᵃ are on the left-hand side of said cam, and each cam is provided on its side opposite the ratchet-teeth with a cut-away portion, said cut-away portion being designated by 56 and 56ᵃ, respectively.

The operation of the parts thus far described is as follows: Assuming that the matrix at the left of Fig. 1 is in operative position beneath the assembling device and that the matrix-bed 30ᵃ is raised, as shown in full lines, Fig. 13, it will now be obvious that whenever the slides 5 are moved in the direction of the arrow, Fig. 2, the pawl 43 of finger 41ᵃ will engage one tooth of the ratchet 40ᵃ and will turn the cam 35ᵃ in the direction of the arrow, Fig. 15, thereby allowing the pin 37ᵃ to run down the face of the said cam and matrix-bed 30ᵃ to be lowered under the influence of the springs 34, the other finger 41 during such forward movement of the slides reciprocating in the cut-away portion 56ᵃ of the cam. (See Fig. 15.) In this embodiment of my invention the length of the ratchet-teeth are such that each forward movement of the finger turns the cam a distance sufficient to allow the matrix-bottom to be lowered enough to receive two lifts of the heel. This forward movement of the slides gives to the selectors $d'$, $e'$, $f'$, and $g'$ forward movement, as above explained, whereby the lift B is deposited on the bed of the matrix, and the reverse movement will withdraw the said selectors and move forwardly the selectors $a'$, $b$, and $c'$ to deposit the second lift upon the matrix; but such reverse movement will not, of course, lower the matrix-bed farther, as the pawl 41ᵃ yields and clicks over the teeth 40ᵃ as the finger is withdrawn. During the next succeeding forward movement the pawl at the end of finger 41ᵃ engages the next ratchet-tooth 40ᵃ and turns the cam 35ᵃ into the dotted-line position, Fig. 13, thereby allowing the matrix-bed to assume its lowest position, and at the same time the two groups of selectors operate to deposit in the matrix the next succeeding two layers of the heel. In the present embodiment of my invention the heel is shown as comprising only four lifts, and hence is completed when the slides 5 have made two complete reciprocations. After the heel is completed the selector-operating devices cease operation, as will be presently described, and the matrix-supporting slide 20 is moved transversely of the machine, thereby bringing the empty right-hand matrix, Fig. 1, beneath the selectors and carrying the filled matrix out to the left-hand side of the machine. The selector-operating devices are now again set in operation, and a second heel is built up in the second matrix, as will be readily understood. When the second matrix comes under the selectors, its bed is in an elevated position and the cam 35 is in the dotted-line position, Fig. 14, but as the slides 5 begin their forward stroke to operate the selectors the pawl on finger 41 engages the ratchet-teeth 40 and turns the cam 35 in the direction of the arrow, Fig. 16, thereby allowing the matrix-bed to be lowered, the finger 41ᵃ meanwhile playing idly through the cut-away portion 56, as seen in Fig. 16. The forward and backward strokes of the slides, which constitute what I have termed "one complete reciprocation," deliver to the matrix the first two lifts of the heel, and during the second forward stroke the cam 35 is given another turn and is moved into the full-line position, Fig. 14, the matrix-bed now being fully lowered. The next two lifts are now deposited in the matrix, as will be apparent, and when the second heel is completed the matrix-supporting slide 20 is again moved transversely of the machine and into the position illustrated in Fig. 1, thus carrying the second completed heel beyond the side of the machine. During the time that the second heel is being built up in the right-hand matrix the heel first made in the left-hand matrix is discharged from the matrix by mechanism to be presently described, so that when the matrix-supporting slide is again moved into the position shown in Fig. 1 to bring the left-hand matrix beneath the assembling device said matrix is empty and ready to receive the pieces constituting another heel. It will be understood, of course, that while the pieces comprising any one heel are being assembled in either matrix said matrix is in its expanded condition, as seen in dotted lines at the left, Fig. 3, the expanded condition of the matrix allowing the pieces to be readily delivered thereto. As soon, however, as the heel is completed and the matrix is moved away from the assembling device the matrix is collapsed to force the pieces of each lift together edgewise, and at the same time pressure is applied to the top lift to compress the heel. The collapsing of the matrix is conveniently accomplished by providing the guides 44, having cam or beveled ends, which are engaged by the inclined sides 50 of the sliding blocks 22 and 23 as the slide 20 begins its lateral movement, said guides operating to force the said sliding blocks inwardly, as seen in full lines at the central portion of Fig. 3, thus compressing the heel edgewise. It will be noticed that the depth of the matrix is slightly less than the thickness of the heel, (see Fig. 14,) so that the top lift of the completed heel projects slightly above the matrix, and that the under side of the bed 3 is beveled somewhat on each side of the matrix, as at 313. It will now be obvious that as soon as the matrix, with the completed heel therein, as seen in Fig. 14, moves toward the right the heel in passing under the beveled portion 313 will be compressed. As will be presently described, each piece has some suitable adhesive applied thereto as it is delivered to the matrix, and consequently the pressure the heel receives, both edgewise and transversely, serves to force the pieces tightly together and cause them to firmly adhere to each other. As the slide continues its movement sufficiently far to bring the matrix beyond the side of the frame 3' the cam 35 is operated to raise the bed-piece 30 of the matrix to thereby lift the heel above the top of the slide 20, whereby the same may be removed. For this purpose I have secured to the cam 35 a cam-like arm 51, which when the bed 30 is lowered stands in the position shown in dotted lines at the left in Fig. 3. A suitable projection 53 is secured to the inside of a box-like guide 54, extending laterally from the frame 3' and through which the slide 21 passes in such a position as to engage the cam-arm 51 as the slide or matrix-supporting member 20 continues its movement and turn the said arm into the position shown at the right, Fig. 3, the said cam-arm operating to turn the cam 35, and thus raise the bed-piece 30, as will be obvious, the bed-piece in its raised position coming flush with the top of the slide 20, whereby the heel may be readily removed.

The cam 51 is shown as resting upon the lower rail 33 of the slide and as having a polygonal-shaped aperture therethrough, through which projects the correspondingly-shaped lower portion of the cam 35, (see Fig. 14,) whereby the two parts 35 and 51 are rigidly secured together. The lower end of the cam 35 has a series of recesses 54' therein, the number depending upon the number of teeth in the ratchet 40, and said recesses have coöperating therewith a spring member or retaining device 55, secured to the lower rail 33, the said spring member operating to hold the cam 35 in any adjusted position. When the bed-plate 30 of the matrix has been raised, as above described, and the heel removed therefrom, the retaining device 55 will maintain this bed-plate raised until the matrix has been returned to its operative position, when the finger 41 will again be brought into play to lower the bed-plate, as just described.

It will be understood that the means for raising the bed of the left-hand matrix, Fig. 1, is the same in all respects as that just described with reference to the right-hand matrix, and consequently further explanation will not be necessary.

Since the movement of the slide 20 in carrying one matrix from its receiving to its discharging position is just the reverse of the movement necessary to carry the other matrix from its receiving to its discharging position, the two cams 51 will of course be reversed in position, and the turning movement of the cam 35 to raise and lower one matrix-bed will be opposite to that of the cam for raising and lowering the other matrix-bed.

In order that the various pieces forming the heel may adhere together when deposited in the matrix, I provide means for applying paste to each piece as it is being carried to the matrix. For this purpose each runway has situated beneath the same in some convenient place between the hopper and the matrix a cup-shaped paste-receiving member 60, and a slot 61 is provided in the bed beneath the runway, through which the paste passes from the cup into the runway. The various paste-receiving cups 60 are connected, by means of suitable pipes 62, to one or more tanks or reservoirs 63, situated in any convenient position and containing paste. Any suitable means may be employed to put the paste under sufficient pressure to force the same into the cups 60 and up through the slots 61. With this construction it will be obvious that if a piece—e, for instance, Fig. 11—is being moved toward the matrix by selector e' the said piece in passing over the slot 61 will become more or less smeared with paste, and since means are provided for delivering paste to every runway it follows that all the pieces will have sufficient paste applied thereto, so that when assembled to form a heel they will adhere together.

While I have referred to paste as the adhesive employed, it will be obvious that any suitable adhesive other than paste may be used, if desired.

Any suitable mechanism may be employed for operating the various parts above described, and while it is entirely within the scope of my invention to provide means for manually performing the above-named operations, yet I prefer to employ automatic means for this purpose, and one form of such means will now be described.

Figures 6, 7, 8:
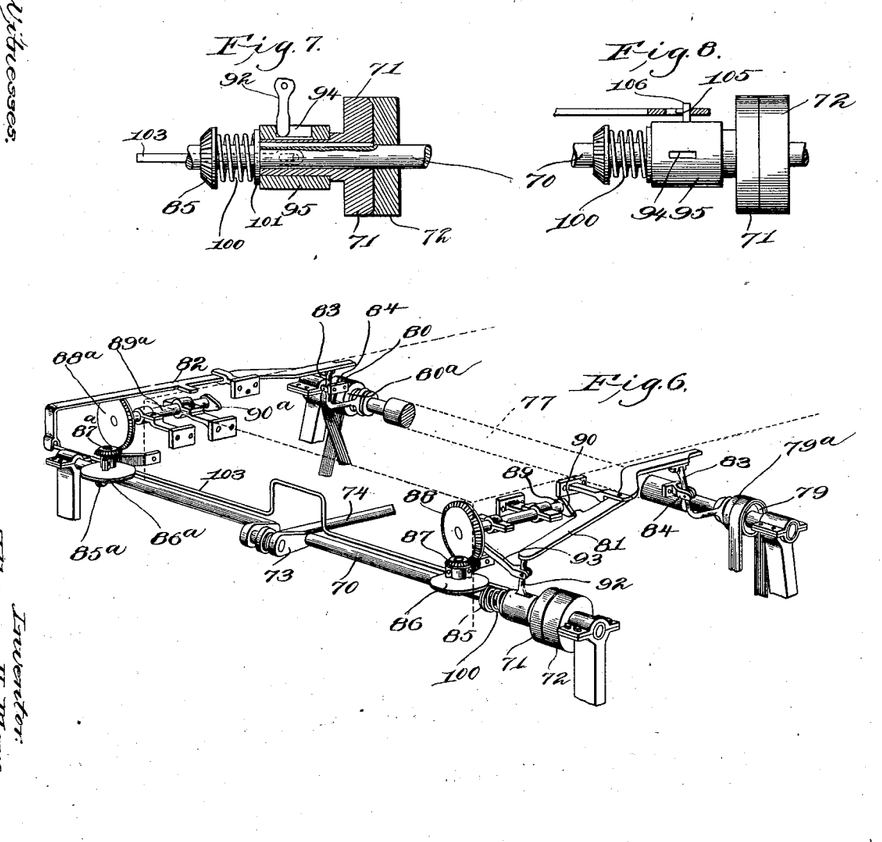

In Fig. 6 I have illustrated a main driving-shaft 70, having two clutch members 71 and 72 thereon, the said shaft being mounted in any suitable bearings. The shaft is shown as provided with a crank portion 73, to which is secured one end of the pitman 74, the other end being fastened to the slides 5 in any suitable way, as by means of the bridge-piece 75. The rotation of the shaft 70 therefore gives to the slides their reciprocation. The matrix-supporting slide 20 is reciprocated by means of a screw 77, extending transversely of the frame and engaging a nut 78, fast to the lower rail 33 of said slide. The shaft supporting the screw 77 has thereon the loose clutch members 79 and 80, which are continuously rotated in opposite directions by any suitable means. (Not shown.) Coöperating clutch members 79$^a$ and 80$^a$ are feathered to the screw-shaft, so as to rotate therewith, but have a movement longitudinally thereof, and it will be obvious, therefore, that when the clutch members 79 79$^a$ are in engagement the screw 77 will be rotated in one direction, while when the clutch members 80 and 80ª are in engagement the said screw will have an opposite rotation. The clutch members 79ª and 80ª are moved into and out of engagement at the appropriate times by means of spring-pressed operating-levers 81 and 82, respectively, the said levers being pivoted on opposite sides of the frame 3' and each having pivoted to one end a connecting-lever 83, which in turn is pivoted intermediate its ends to a suitable bracket 84 on the frame 3'. The end of each lever 83 is forked, and the forked end of one lever engages a groove in the hub of the clutch member 79ª, while the forked end of the other lever engages a similar groove in the hub of the clutch member 80ª. The time of operation of each of the operating-levers 81 and 82 is controlled by the main shaft 70, and for this purpose I have shown the said shaft as provided with two bevel-gears 85 and 85ª, which mesh with bevel-gears 86 86ª, respectively, in vertical shafts carried in suitable bearings by the frame, the said shafts having at their upper ends bevel-gears 87 87ª, respectively meshing with corresponding bevel-gears 88 88ª upon shafts 89 89ª, also supported in suitable bearings in the frame. The shafts 89 89ª carry cams 90 and 90ª, respectively, the cam on shaft 89 coöperating with the operating-lever 81 and the cam on shaft 89ª coöperating with the lever 82. In this embodiment of my invention the system of gearing between the main shaft 70 and the levers 81 and 82 is such that each lever is operated every fourth revolution of the shaft 70, the operation of the levers being in alternation—that is, the lever 81 being operated after two revolutions of the shaft, the lever 82 after four revolutions, and lever 81 again after six revolutions, &c. This special timing of the operations of the levers, however, is that employed when the heel is made of four lifts; but it will be obvious that if the heel is made of a greater or less number of lifts the gearing will be changed to give to the cams the proper speed with relation to the shaft 70 to correspond with the number of lifts in the heel. The loose clutch member 71 on the shaft 70 is controlled as to its operation by the levers 81 82, respectively, and for this purpose the outer end of lever 81 has pivoted thereto a vertical lever 92, which in turn is centrally pivoted to a fixed support, such as an arm or bracket 93, the lower end of the lever playing in a suitable groove or slot 94 in a sleeve 95 upon a hub of the clutch member 71. A suitable spring 100, coiled about the shaft 70 and confined between the bevel-gear 85 fast thereon and a flange 101 on the hub of the clutch member 71, serves normally to throw the clutch members 70 and 71 into engagement, the said members being disengaged by means of the lever 92 or by means of a rod 103, connected at one end to the downwardly-turned end of lever 82 and at its other end having a slot 105, which receives a pin 106 on the sleeve 95.

Figure 12:
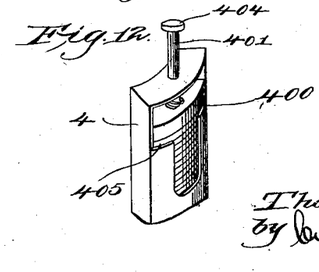
Figure 23:
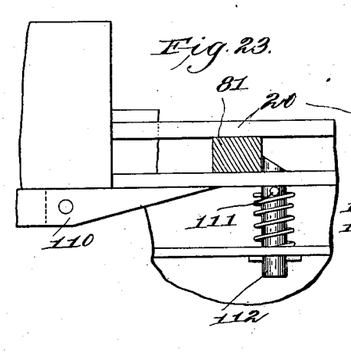
Figs. 23, 24, and 25 are details hereinafter described.
Figures 24, 25:
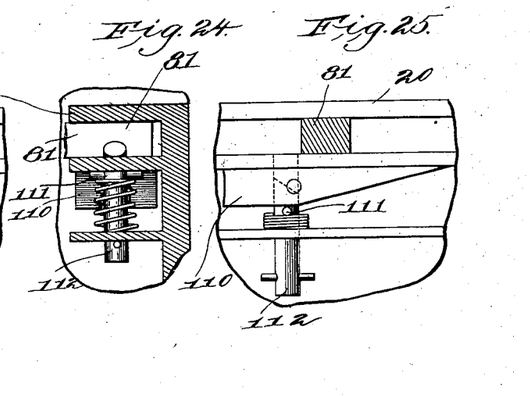

The operation of the parts is as follows: Assuming that the clutch members 71 and 72 are in engagement and the clutch members 79 79ª and 80 80ª are out of engagement, the shaft 70 will be rotated and will operate the selectors to select and deliver to the matrix the appropriately-shaped pieces to form the heel, and at the same time one of the fingers 41 41ª will gradually lower the matrix-bed. When two complete revolutions of the shaft 70 have been made, and consequently four layers or lifts have been assembled, the rise of the cam 90 will operate against the lever 81, throwing said lever over to the position shown in Fig. 6 against the action of the spring 113 and through the lever 92 disengaging the clutch member 71, thereby stopping the rotation of the shaft 70. At the same time, however, the lever 83 is operated in such a way as to bring the clutch members 79 79ª into engagement, which is the position of the parts shown in Figs. 4 and 6. As the lever 81 is moved into this position the inward end snaps over the beveled upper end of a spring-pressed latch-pin 112, Fig. 12, and is held in such position by the latch, said latch-pin being shown as vertically movable in the matrix-supporting member or slide. I would here remark that the end of the lever 81 moves in a suitable guideway 189, and is therefore prevented from becoming disengaged from the latch-pin except when the latch-pin is lowered. When the parts are in this position, the screw 77 will be rotated in a direction to move the slide 20 to the right, Fig. 4, thereby bringing the left-hand matrix under the assembling device and carrying the filled matrix beyond the side of the frame. As the slide 20 reaches the end of its movement a forked cam 110 on the slide engages the cross-pin 111 in the latch 112, depresses said latch, and thereby releases the lever 81, (see Figs. 23 and 25,) which through the influence of the spring 113 is turned back to its initial position, thereby engaging again the clutch members 71 72 and disengaging the clutch members 79 79ª. The shaft 70 is now again rotated for two revolutions, and the selectors operate to build up a second heel in the second matrix, at the end of which two revolutions the cam 90ª, coöperating with the lever 82, is in a proper position to throw said lever outward from the frame, thereby causing the clutch members 80 80ª to be brought into engagement and at the same time forcing the inner end of said lever 82 over the corresponding latch-pin 112. The outward movement of the outer end of the lever 82 serves through the link or connection 103 to disengage the clutch member 71, the slot 94 allowing such movement without in any way affecting the position of the levers 92 and 81. The screw-shaft 77 is now rotated in a direction to give the slide 20 a movement to the left, Fig. 4, and when the said slide reaches the limit of its movement, which is that shown in Fig. 4, the cam 110ᵃ thereon engages the latch-pin 112ᵃ, thereby releasing the lever 82 and throwing the clutch members 80 and 80ᵃ out of engagement. As the lever is released the spring 100 brings the clutch members 71 72 into engagement, and the shaft 70 is thereby again rotated. The operation of the device is thereby entirely automatic in its operation.

In the foregoing description and in the claims I have used the term "matrix" when referring to the place or portion of the machine where the several pieces are assembled in the form of a heel. The particular matrix which has been herein shown and described, however, is not essential to my invention, and by the term "matrix" as used in the claims, except when otherwise specified, I mean that portion of the machine of whatever construction it may be where the various pieces are assembled in approximately their proper relative positions to form a lift of the heel.

While it has been necessary in order to properly explain my invention to herein illustrate and describe one specific mechanism embodying the invention, I desire to state that my invention is not limited to the structure herein shown and that the specific form of matrix and the structure of the assembling devices may be changed or varied in many ways without departing from the spirit of my invention, it only being essential to my invention that some form of mechanism be employed to select and deliver to the matrix the appropriately-shaped pieces to form a heel.

Believing that I am the first to devise a machine for assembling the necessary pieces to form a heel, I desire to claim the same broadly, and I would consider as coming within my invention any mechanism by means of which the pieces may be selected and assembled in the form of a heel.

Having described my invention, what I claim, and desire to secure by Letters Patent, is—

1. In an apparatus for making heels in which one or more of the lifts are composed of a plurality of pieces, a matrix, and mechanism to deliver to the matrix separately the individual pieces composing the pieced lift or lifts of the heel.

2. In an apparatus for making heels in which each lift is composed of a plurality of pieces, a matrix, and mechanism to deliver to the matrix separately the various pieces forming each lift of the heel, said means operating to form the lifts in succession.

3. In an apparatus for making heels in which each lift is composed of a plurality of pieces, a matrix in which the heel is formed, means to deliver to the matrix simultaneously the individual pieces forming one lift of the heel, and means to form the separate lifts in succession.

4. In an apparatus for making heels in which each lift is composed of a plurality of pieces, a matrix in which the heel is formed, automatic mechanism operating to deliver to the matrix the various pieces of which a single lift is composed and to form the several lifts in succession.

5. In an apparatus for making pieced heels, a matrix in which the heel is formed, automatic mechanism operating to deliver to the matrix simultaneously the various pieces forming a single lift and to form the several lifts successively.

6. In an apparatus for making pieced heels, a matrix, and a plurality of selectors to select the appropriately-shaped pieces for each lift of the heel, and deliver said pieces to the matrix.

7. In an apparatus for making pieced heels, a matrix, and a plurality of series of selectors, to select and deliver to the matrix the appropriately-shaped pieces for the heel, each series of selectors operating to select the pieces comprising a single lift.

8. In an apparatus for making pieced heels, a matrix, a plurality of series of selectors to select the appropriately-shaped pieces for the heel and to deliver them to the matrix, each series of selectors operating to select the pieces composing a single lift, and means to operate all the selectors of each series simultaneously.

9. In an apparatus for making pieced heels, a matrix, a plurality of selectors moving in paths diverging from the matrix, and selector-operating mechanism, said selectors being arranged in series and the selectors of each series operating to select the pieces of which a single lift is composed.

10. In an apparatus for making pieced heels, a bed, a matrix, a plurality of runways in the bed, a selector in each runway, said selectors being divided into groups, means to feed differently-shaped pieces to the several runways, and means to operate each group of selectors simultaneously, each group of selectors operating to deliver to the matrix the pieces composing a single lift.

11. In an apparatus for making pieced heels, a matrix, a plurality of series of runways leading to said matrix, the runways of one series being in a different horizontal plane from those of the other series, a selector in each runway, and selector-operating mechanism, said selectors operating to deliver to the matrix the appropriately-shaped pieces to form a heel.

12. In an apparatus for making pieced heels, a matrix, a plurality of series of runways, the runways of one series being in a different horizontal plane from those of the other series, a selector in each runway, selector-operating mechanism, and means to feed to the several runways appropriately-shaped pieces to form the heel.

13. In an apparatus for making pieced heels, a matrix, a plurality of series of selectors, the selectors of each series operating to select the appropriately-shaped pieces for one lift of the heel, and deliver said pieces to the matrix, and means to operate the series of selectors in succession whereby the lifts are formed successively, each of said selectors being constructed to deliver the pieces selected thereby to the matrix in proper position.

14. In an apparatus for making pieced heels, a matrix, a plurality of runways leading to said matrix, a selector in each runway, and selector-operating mechanism, said selectors being adapted to select the pieces composing the heel and being constructed to position the pieces in the matrix.

15. In an apparatus for making pieced heels, a matrix, a plurality of runways leading to the matrix, a selector in each runway, the end of the selector being shaped to correspond to the shape of the piece delivered to the matrix thereby, and selector-operating mechanism.

16. In a machine for making pieced heels, a frame having a bed, a matrix situated centrally thereof, two groups of selectors moving in paths diverging from the matrix, a longitudinally-movable slide carried by the frame, and connections between said slide and selectors whereby when the slide moves in one direction one group of selectors is moved toward the matrix, and when said slide is moved in the opposite direction the other group of selectors is given a similar movement.

17. In a machine for making pieced heels, a frame, a matrix situated centrally thereof, two groups of selectors, the selectors of each group moving in paths diverging from the matrix, a longitudinally-movable slide, connections between said slide and each of the selectors whereby when the slide is moved in one direction one group of selectors is given a movement toward the matrix, and when the slide moves in the opposite direction the other group is given a similar movement, and means to feed to the selectors of each group the various pieces of which a single lift of the heel is composed.

18. In an apparatus for making pieced heels, a matrix, means to deliver to the matrix appropriately-shaped pieces to comprise a heel, and means to apply an adhesive to the pieces.

19. In an apparatus for making pieced heels, means to assemble the appropriately-shaped pieces of which the heel is made, and automatic mechanism to apply an adhesive to the pieces as they are being assembled.

20. In an apparatus for making pieced heels, a matrix, a plurality of groups of selectors to select the appropriately-shaped pieces for the heel and deliver them to the matrix, each series of selectors operating to select the pieces composing a single lift, and means to apply an adhesive to each individual piece as it is being delivered to the matrix.

21. In an apparatus for making pieced heels, a frame having a bed-plate, a matrix, runways in the bed-plate, a selector in each runway, said selectors operating to deliver appropriately-shaped pieces to the matrix, each of said runways having a slot through the bottom thereof, and a paste-cup beneath said slot.

22. In an apparatus for making pieced heels, a frame having a bed-plate, a matrix, runways in the bed-plate, a selector in each runway, said selectors operating to deliver appropriately-shaped pieces to the matrix, each of said runways having a slot through the bottom thereof, a paste-cup beneath said slot, and means for maintaining paste under pressure in each of said paste-cups.

23. In an apparatus for making pieced heels, a heel-assembling mechanism, a plurality of matrices, and means to bring each matrix separately into operative relation to the assembling mechanism.

24. In a heel-assembling mechanism, two separate matrices, and means to alternately bring said matrices into operative relation to the assembling mechanism.

25. In a machine for making pieced heels, a heel-assembling mechanism, a movable member having two matrices thereon, and means to move said member to bring either matrix into operative relation to the assembling mechanism.

26. In an apparatus for making pieced heels, a heel-assembling mechanism, a movable member having two matrices, means to move said member to bring either matrix into operative relation to the assembling mechanism, and means to render the assembling mechanism inactive while the matrices are being shifted.

27. In an apparatus for making pieced heels, a heel-assembling mechanism, a movable matrix-supporting member having two matrices thereon, means to move said member to bring either matrix into operative relation to the assembling mechanism, and automatic devices controlling the operation of said parts, said devices being constructed to render the means for moving the matrix-supporting member inactive while the assembling devices are active, and vice versa.

28. In an apparatus for making pieced heels, a plurality of matrices, a heel-assembling mechanism operating to deliver to the operative matrix the various pieces necessary to form a heel, means to remove each matrix from the assembling mechanism when a heel has been formed therein, and to place an empty matrix in operative relation to the assembling mechanism, and means to render said assembling mechanism inactive during the time when the matrices are being shifted.

29. In an apparatus for making pieced heels, a frame, a heel-assembling mechanism thereon, a movable matrix-supporting member having two matrices thereon, a screw to give said matrix-supporting member a movement to bring either matrix beneath the assembling mechanism, and automatic means controlling the times of operation of said screw and assembling mechanism respectively, the construction being such that the assembling mechanism is inactive while the screw is shifting the position of the matrices and the screw is inactive while the assembling mechanism is in operation.

30. In an apparatus for making pieced heels, a heel-assembling mechanism, a movable matrix-supporting member having two matrices thereon, a shaft having a screw engaging said matrix-supporting member, oppositely-rotating pulleys loose on said shaft, means to clutch either pulley to the shaft, and means controlled by the movement of the matrix-supporting member to operate the clutch mechanism.

31. In an apparatus for making pieced heels, a heel-assembling mechanism, a matrix-supporting member having two matrices thereon, means to move the said matrix-supporting member to bring either matrix into operative relation to the assembling mechanism, and means controlled by the movement of the said matrix-supporting member to stop its movement when either matrix has been brought into such operative relation.

32. In an apparatus for making pieced heels, a heel-assembling mechanism, a matrix-supporting member having two matrices thereon, a shaft having a screw engaging said matrix-supporting member, two clutches on said shaft, each clutch comprising a clutch member loose on said shaft, and a coöperating clutch member splined thereto, said loose clutch members rotating in opposite directions, means tending normally to hold the clutch members of each clutch disengaged, a latch mechanism to hold the members of either clutch in engagement whereby the shaft may be rotated in either direction to bring either matrix into operative relation with the assembling mechanism, and means controlled by the movement of the matrix-supporting member to release said latch mechanism when the matrix comes into operative relation with the assembling mechanism.

33. In an apparatus for making pieced heels, a frame, a heel-assembling mechanism thereon, a sliding matrix-supporting member mounted for movement transverse to the frame, two matrices carried by said member, a screw-shaft extending beneath the matrix-supporting member and engaging the same, a clutch at each end of said shaft, said clutches constructed to rotate the shaft in opposite directions, a latch-pin for each of said clutches, said latch-pin when operative serving to maintain the corresponding clutch in operation whereby the matrix-supporting member is given a transverse movement, and a cam carried by the said member and adapted to engage and release the operative latch-pin when a matrix is brought into operative relation with the assembling mechanism.

34. In an apparatus for making pieced heels, an expansible matrix, means to deliver to the expanded matrix the various pieces composing the heel, and automatic means to thereafter collapse the matrix.

35. In a heel-assembling mechanism, an expansible matrix, means tending normally to hold the matrix in its expanded shape, means to deliver to the matrix the various pieces composing the heel, and automatic means to thereafter collapse the matrix.

36. In a machine for making pieced heels, a matrix in which the heel is formed, said matrix having a portion of the side walls thereof movable toward and from its center, means tending normally to hold said movable portions of the sides expanded, means to deliver to the matrix the various pieces composing a heel, and automatic means to force said movable portions of the matrix-wall inward whereby the various pieces of the heel are forced together.

37. In an apparatus for making pieced heels, an expansible matrix in which the heel is formed, said matrix being normally expanded, heel-assembling mechanism operating to deliver to the expanded matrix the various pieces of which the heel is to be made, means to remove the filled matrix from the assembling mechanism, and means acting during such movement of the matrix to collapse the latter.

38. In an apparatus for making pieced heels, an expansible matrix, means tending normally to maintain said matrix in its expanded condition, assembling mechanism to deliver to the expanded matrix the various pieces of which the heel is to be made, means to remove the filled matrix from the assembling mechanism, and cams acting on the matrix as it is removed to collapse the same.

39. In an apparatus for making pieced heels, a matrix having a portion of its side wall movable toward and from its center means tending normally to hold said movable portion of the matrix expanded, assembling mechanism to deliver to the matrix the various pieces of which the heel is made, means to remove the filled matrix from the assembling mechanism, and cams acting against the movable portion of the matrix, and operating to force the same inward.

40. In an apparatus for making pieced heels, a matrix, means to deliver to the matrix the various pieces of which the heel is to be made, said matrix having a movable bed or bottom, and means to lower the matrix-bottom as the various lifts are assembled in the matrix.

41. In an apparatus for making pieced heels, a matrix having a movable bottom, means to deliver to the matrix in succession the various lifts of the heel, and means to lower the matrix-bottom so as to increase the depth of the matrix as the lifts are delivered.

42. In an apparatus for making pieced heels, a matrix having a movable bottom, means to deliver to the matrix the various pieces composing the heel, said means operating to deliver simultaneously the pieces composing each lift, and to form the lifts successively, and means to lower the matrix-bottom as the lifts are assembled.

43. In an apparatus for making pieced heels, a matrix, a heel-assembling mechanism above the matrix and constructed to deliver thereto the various pieces composing the heel, said matrix having a movable bottom, means to lower the bottom as the heel is built up in the matrix, means to remove the matrix from the assembling mechanism when the heel is completed, and means thereafter to automatically raise the matrix-bottom and force the completed heel from the matrix.

44. In an apparatus for making pieced heels, a matrix, heel-assembling mechanism above the matrix and constructed to deliver thereto the various pieces composing the heel, said matrix having a movable bottom, a cam to govern the position of the matrix-bottom, and means operated by the assembling mechanism to turn the cam whereby the depth of the matrix is increased as the heel is built up therein.

45. In an apparatus for making pieced heels, a matrix having a movable bottom, a plurality of selectors to deliver to the matrix the various pieces of which the heel is made, selector-operating mechanism, a stem depending from the matrix-bottom, and having a projection thereon, a cam to engage said projection, and means to operate the cam from the selector-operating mechanism whereby the position of the matrix-bottom is determined by the selector-operating mechanism.

46. In an apparatus for making pieced heels, a matrix, a heel-assembling mechanism, means to move the matrix beneath the assembling mechanism to be filled, and to withdraw the said matrix from the assembling mechanism when it is filled, and means to eject the completed heel from the matrix.

47. In an apparatus for making pieced heels, a matrix, having a movable bottom, heel-assembling mechanism to deliver the appropriately-shaped pieces to the matrix, means operated by the assembling mechanism to lower the matrix-bottom as the heel is built up therein, means to remove the matrix from the assembling mechanism, and automatic mechanism operated by the movement of the matrix to raise the matrix-bottom and eject the finished heel therefrom.

48. In an apparatus for making heels in which each lift is composed of a plurality of pieces, appliances for selecting and assembling in the proper relative positions the appropriately-shaped pieces to form each lift of the heel.

49. In an apparatus for making pieced heels in which each lift is composed of a plurality of pieces, appliances for selecting and assembling in the proper relative positions the appropriately-shaped pieces to form each lift of the heel, and automatic means to compress the heel when made.

50. In an apparatus for making heels in which each lift is composed of a plurality of pieces, appliances for selecting and assembling in the proper relative positions the appropriately-shaped pieces which are to compose each lift of the heel, said appliances operating to form the lifts in succession.

51. In apparatus for making heels, a matrix, assembling mechanism adapted to deliver to the matrix the pieces of which the completed heel is composed, and means to give one of said parts a bodily movement with relation to the other, whereby they may be brought into proper relative position for the heel to be assembled in the matrix, and thereafter separated bodily from each other.

52. In an apparatus for making heels, a movable matrix, assembling mechanism operating to deliver to the matrix the pieces of which the completed heel is composed, and means to remove the matrix from the assembling mechanism when the heel is completed.

53. In an apparatus of the class described, a movable matrix, assembling mechanism operating to deliver to the matrix the pieces of which the completed heel is composed, means to move the matrix into operative position to receive the pieces from the assembling mechanism and to remove the matrix with the completed heel therein from the assembling mechanism.

54. In an apparatus of the class described, a movable matrix, assembling mechanism operating to deliver to the matrix the pieces of which the completed heel is composed, means to move the matrix into operative position to receive the pieces from the assembling mechanism and to remove the matrix with the completed heel therein from the assembling mechanism, and means to discharge the completed heel from the matrix.

55. In an apparatus for making heels in which each lift is composed of a plurality of pieces, a matrix, mechanism to deliver to the matrix separately the individual pieces composing each lift of the heel, and automatic means to discharge the completed heel from the matrix.

56. In an apparatus for making heels in which each lift is composed of a plurality of pieces, a matrix, mechanism to deliver to the matrix separately the individual pieces of which each lift is composed, said mechanism operating to build the lifts in succession, and automatic means to discharge the completed heel from the matrix.

57. In an apparatus of the class described, a matrix for forming heels, having side walls and an adjustable bed or bottom, whereby the depth of the matrix may be varied, means to deliver the pieces of which the heel is composed to said matrix, and means to vary the depth of the latter as the heel is built up.

58. A matrix for forming heels having side walls and a vertically-movable bottom, and means to lower the bottom as the lifts are delivered to the matrix.

59. A heel-forming matrix having a movable bottom, means to lower the bottom as the heel-lifts are assembled in the matrix, and means to raise the bottom to discharge the completed heel from the matrix.

60. A matrix for forming heels, and means to vary the depth of the matrix as the heel is formed therein.

61. In a machine for making heels, a matrix, assembling mechanism operating to deliver to the matrix the pieces composing the heel, means to remove the matrix from the assembling mechanism, and means to discharge the completed heel from the matrix.

62. In a machine for making heels, a collapsible matrix, assembling mechanism operating to deliver to the matrix the pieces composing the heel, means to collapse the matrix, means to remove the matrix with the completed heel therein from the delivery mechanism, and means to discharge the completed heel from the matrix.

63. In an apparatus of the class described, a matrix, means to deliver to the matrix the pieces of which the completed heel is composed, means to form the heel in the matrix, means to remove the matrix from the delivery mechanism, and means to discharge the completed heel from said matrix.

64. In apparatus of the class described, a plurality of matrices, assembling mechanism adapted to deliver to the matrices the pieces composing a heel, and means to give the assembling mechanism and matrices a bodily movement with relation to each other, whereby the assembling mechanism and each matrix may be brought into the proper relative position to have a heel formed in the latter.

65. In apparatus for making heels in which one or more of the lifts are composed of a plurality of pieces, a matrix and mechanism to deliver separately to the matrix the individual pieces composing the pieced lift or lifts of the heel and means to discharge the completed heel from the matrix.

66. In an apparatus for making heels in which one or more of the lifts are composed of a plurality of pieces, appliances for building the lifts of the heels, one upon the other, said appliances operating to select and assemble in the proper relative positions the appropriately-shaped pieces to form the pieced lift or lifts of the heel.

In testimony whereof I have signed my name to this specification in the presence of two subscribing witnesses.

THOMAS H. MAYO.

Witnesses:
LOUIS C. SMITH,
GEO. W. GREGORY.